United States Patent [19]

Meyerle

[11] 4,081,747

[45] Mar. 28, 1978

[54] REMOTE CONTROL FOR COMMUNICATION APPARATUS

[76] Inventor: George M. Meyerle, Lakeview Dr., Candlewood Orchards, Brookfield, Conn. 06804

[21] Appl. No.: 702,694

[22] Filed: Jul. 6, 1976

[51] Int. Cl.² .................................................. H04B 7/00

[52] U.S. Cl. ........................................... 325/37; 325/55; 325/64; 343/225

[58] Field of Search ............................... 325/37, 55, 64; 340/224, 207 R, 171 R; 343/225, 228; 179/15 BM, 2 C, 2 E

[56] References Cited

U.S. PATENT DOCUMENTS

| | | | |
|---|---|---|---|
| 2,583,484 | 1/1952 | Guanella et al. | 179/15 BM |
| 3,103,664 | 9/1963 | Hooper | 325/37 |
| 3,366,961 | 1/1968 | Goldstein | 325/37 |
| 3,835,454 | 9/1974 | Palmieri et al. | 325/37 |
| 4,005,269 | 1/1977 | Willis | 179/2 C |

*Primary Examiner*—Robert L. Griffin
*Assistant Examiner*—Jin F. Ng
*Attorney, Agent, or Firm*—Parmelee, Johnson & Bollinger

[57] ABSTRACT

A remote control arrangement for a communication system which transmits intelligence occurring within a band of frequencies $f_b$ between first and second remotely located stations is described. The remote control arrangement which is adapted to activate an element at the first station comprises an encoder located at the second station and a decoder located at the first station. The encoder provides a control signal of selectively adjustable frequency $f_e$ and period $T_e$. The decoder includes means for detecting a control signal of corresponding frequency $f_e$ and period $T_e$ and for discriminating against signals of differing frequency and period.

2 Claims, 12 Drawing Figures

TRANSCEIVER
ENCODER
PERIOD ADJ.
FREQ ADJ.
COUPLING NETWORK
R.F. AMP.
R.F. TUNER I.F. AMP.
OSC. / MOD.
DETECTOR
AUDIO AMP.
AUDIO AMP
DECODER
INPUT LEVEL
TUNE FREQ
TUNE PERIOD

TRANSCEIVER
DECODER
ENCODER
TRANSCEIVER
DECODER
ENCODER

REMOTE CONTROL FOR COMMUNICATION APPARATUS

BACKGROUND OF THE INVENTION

This invention relates to a remote control arrangement for use with communication apparatus. The invention relates more particularly to an improved remote control which utilizes a communication channel of the apparatus and which provides a control signal having a frequency lying within an information frequency band of the apparatus.

In various communication systems such as radio frequency broadcast and point to point communication systems, long line communication systems, etc., it is desirable not only to provide communication of intelligence between remotely located stations of the system but also, in some instances, to utilize a channel of the communication system for effecting the remote control of a function at one of the stations. The remotely controlled function may comprise, for example, the activation of a speaker for audible reproduction of audio intelligence, the activation of other circuit means, or the control of some element such as a fluid valve, a signal, a horn, or the like. From the viewpoint of simplicity and economy in the fabrication of the communication system, it is desirable to employ for the purposes of remote control the same band of frequencies in which the intelligence being communicated lies. In one form of communication system with which the present invention is particularly useful, a radio frequency carrier signal is modulated by intelligence occurring in the audio frequency band. The modulated carrier signal is broadcast and received by a remotely located receiver which tunes and amplifies the carrier signal; detects the audio modulation components; and audibly reproduces the intelligence. Transceiving apparatus employed in this system is experiencing continuously expanded use in the United States in a band of frequencies known as the citizens band and which presently is located around the 27 MHz radio frequency range.

When providing remote control for causing a particular reaction at the receiver, the receiving unit generally remains energized in order to provide active circuits which are responsive to a received signal. However, a background noise or hiss coupled with relatively heavy and continuous third party transmissions over the same communication channel produces a continuous audible transducer output. A continuous transducer audio output in the absence of intelligence directed to a particular receiving unit becomes annoying and reduces the responsiveness of an individual who is monitoring the particular receiving unit.

It has been found beneficial to eliminate the continuous audible background noise and reproduction of transmissions between other parties by providing a circuit arrangement which deactivates the audio transducer but which remains responsive to communications directed to the particular received for reactivating the transducer. In the interest of simplicity and economy, a transmitting station generates an encoded, control signal having a frequency which lies within the audio frequency band and which is decoded at a receiving station for reactivating the transducer. A means for decoding this remote control signal should be responsive to the encoded control signal which lies within the audio frequency band but should remain non-responsive to communication intelligence, to transmissions between other units, and to electrical noise. However, in many instances, communication apparatus of this type generate the same encoded remote control signal and it has been found that the signal of other users undesirably triggers the decoding circuit of a receiver being monitored. In other instances, certain frequency components of the intelligence being transmitted from a related transmitter or from an unrelated transmitter corresponds to the remote control signal frequency and undesirably confuse and activate the decoder circuit.

Various means have been provided including the use of reed filters, crystal filters and touch tone techniques for enhancing frequency discrimination of the decoder to the remote control system. However, these arrangements undesirably add substantial cost to the apparatus and are economically prohibitive for use with relatively low cost communication systems of the type described.

Accordingly, it is an object of this invention to provide an improved remote control for use with a communication system.

Another object of the invention is to provide an improved remote control with a communication system having an encoding signal lying within the same band of frequencies as the intelligence being communicated.

Another object of the invention is to provide a remote control for a communication system of the type described having improved means for providing a plurality of selectable encoding signals.

A further object of the invention is to provide a remote control for a communication system of the type described having an improved means for providing a plurality of encoding signals lying within a communication intelligence band and having means for tuning a decoder to the encoded signal.

Another object of the invention is to provide a remote control for a communication system of the type described, which exhibits improved discrimination and enhanced economy of construction.

Another object of the invention is to provide an improved remote control encoder for a communication system of the type described.

Another object of the invention is to provide an improved decoder for a communication system of the type described.

Another object of the invention is to provide encoder and decoder means which are adapted to be readily coupled to and decoupled from presently existing communication apparatus of the type described.

SUMMARY OF THE INVENTION

In accordance with features of the present invention, there is provided a remote control arrangement for a communication system which transmits intelligence occurring within a band of frequencies $f_b$ between first and second remotely located stations. The remote control arrangement which is adapted to activate an element at the first station, comprises an encoder means located at the second station and a decoder means located at the first station. The encoder means provides a remote control signal having a preselected frequency $f_e$ which occurs for a preselected interval of time $T_e$. Adjustable means are provided at the encoder for selectively varying the frequency $f_e$ over a range of frequencies lying in the band of frequencies $f_b$ and adjustable means are provided for selectively varying the interval of time $Te$. The decoder includes means for detecting the reception of a signal of preselected frequency $f_e$ and preselected interval $T_e$ and for activating an element upon detection of the signal. The decoding means more particularly includes adjustable circuit means for tuning the decoder to be selectively responsive to the frequency $f_e$ and adjustable circuit means for tuning the decoder to be selectively responsive to interval $T_e$.

In accordance with more particular features of the invention, the remote control arrangement is utilized with a communication system having first and second radio frequency broadcast transceivers for use at first and second remotely located stations respectively. The decoder means is located at the first of said stations and is coupled to said first transceiver while the encoder means is located at the second station and is coupled to the second transceiver. A control signal generated by the encoder is coupled to the second transceiver acoustically or electrically and is coupled from the second to the first transceiver as a radio frequency modulation component which is received and demodulated by the second transceiver. A demodulated audio frequency signal of the first transceiver is applied to the decoder for decoding control signal components. Decoding of a remote control signal causes activation of an element at the first station. In a particular arrangement, an audio transducer at the first station is activated upon reception of the remote control signal and an audio output signal of the transceiver detector is coupled thereto.

In accordance with other particular features of the invention, the decoder includes circuit means for discriminating between a received control signal and interfering components of demodulated voice signals occurring at the control signal frequency $f_e$; a circuit means for generating a window signal timed with respect to the interval $T_e$ and means for sensing coincidence in time between the occurrence of the window and a trailing edge of an envelope of the remote control signal. circuit means are also provided at the decoder in accordance with a feature of the invention for indicating tuning of the decoder to the preselected frequency $f_e$ and to the preselected interval $T_e$.

THE DRAWINGS

These and other objects and features of the invention will become apparent from the following specification and the drawings wherein.

DETAILED DESCRIPTION

Figures 1, 2:
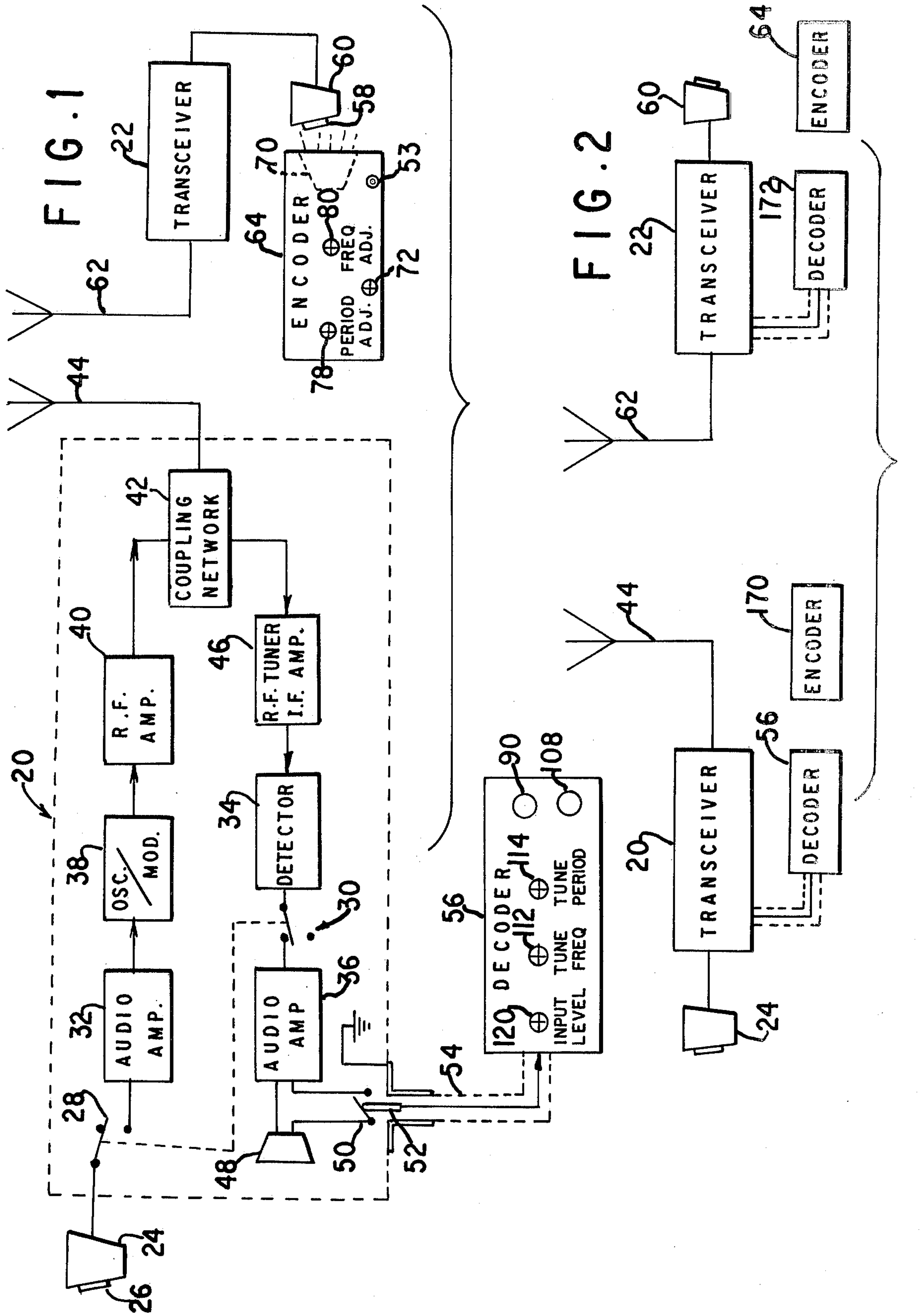
FIG. 1 is a block diagram illustrating a remote control arrangement in accordance with the present invention for use with a communication system.
FIG. 2 is a block diagram of an alternative remote control arrangement constructed in accordance with features of this invention for use with a communication system.

Referring now to the drawings and particularly to FIG. 1, a communication system for transmitting intelligence occurring in a band of frequencies $f_b$ between first and second remotely located stations is illustrated. The communication system comprises a first radio frequency transceiving apparatus 20 which is located at the first station and a second radio frequency transceiving apparatus 22 which is located at a remotely positioned second station. Transceiver 20 is of well known design and includes a microphone transducer 24 which converts sounds into an electrical signal. The transducer provides an electrical signal extending over a band of frequencies $f_b$ corresponding to the audio frequency range. This range may extend from about 20–30 Hz to about 15,000 Hz. When a press-to-talk push button 26 on the microphone 24 is depressed during a transmit mode of operation, circuit means including a first switching arrangement 28 and a second switching arrangement 30 couple the microphone 24 to an audio amplifier 32 and decouple a detector circuit 34 from an output audio amplifier 36. In the transmit mode the audio signals are applied from amplifier 32 to an oscillator-modulator 38 of a transmitting section of the receiver for modulating a radio frequency signal with the audio signal. Oscillator-modulator 38 comprises an amplitude modulation circuit or alternatively a frequency modulation circuit and its output is applied to an RF amplifier 40 for amplification and coupling, via an antenna coupling network 42, to an antenna 44.

In a receiving mode of operation, modulated radio frequency signals which are broadcast by the remote transceiver 22 induce an electrical signal in the antenna 44. This signal is applied, via the antenna coupling network, 42 to a radio frequency tuner and intermediate frequency amplifying stage 46. An output of the intermediate frequency amplifier is applied to a detector circuit 34. During a receive mode, the switch 26 is not depressed and an output of the detector 34 is applied via the switch 30 to the amplifier 36. The amplified audio frequency components are coupled to a transducer comprising a speaker 48 for audible reproduction of the detected audio intelligence. This detected audio intelligence is coupled to the speaker 48 through switch contact elements of a telephone jack, referenced generally as 50. When a telephone plug 52 engages the telephone jack 50, the switch contact coupling between the audio amplifier 36 and the speaker 48 is interrupted, as illustrated in FIG. 1, and the audio signal output of the amplifier 36 is applied via a coaxial cable 54 to a decoder 56 which is described in detail hereinafter.

The second transceiver 22 which is positioned at the remotely located second station is similarly constructed and is tuned to the same frequencies for transmitting and receiving as is the transceiver 20. When a push button 58 of a microphone 60 of the transceiver 22 is depressed, audio information which is acoustically applied to the microphone 60 will be amplified, modulated and broadcast from antenna 62 to the first transceiver 20 at the first remotely located station. A broadcast signal will be detected and the audio signal components will be amplified by the amplifier 36 and applied to the speaker 48 for reproduction, or, alternatively will be coupled to the decoder 56 when the telephone plug 52 engages the jack 50.

An encoder 64 is located at the second station for providing a remote control signal having a preselected frequency $f_3$ which occurs for a preselected interval of time $T_e$. The encoder includes manually adjustable control knobs 66 and 68 which provide for adjustment of the frequency $f_e$ and the interval $T_e$ respectively by a user at the second station. The encoder 64 also includes a speaker 70 which is excited by an electrical signal generated by the encoding means and generates an audible signal. This control signal is generated when the user depresses a push button 72 and occurs for an interal $T_e$ which is established by setting of control knob 78. The encoder speaker 70 and the transceiver microphone 60 are relatively positioned, as is illustrated in FIG. 1, for establishing acoustical coupling between the speaker and microphone. Push button 58 of the microphone 60 and push button 72 of the encoder 64 are simultaneously actuated and a remote control signal which is generated is acoustically coupled to the microphone 60; it is amplified, modulated and transmitted by the transceiver 22 to the remotely located transceiver 20; and, is detected and reproduced by the speaker 48 or alternatively is applied to the decoder 56 for actuating an element which is to be remotely controlled.

Figure 3:
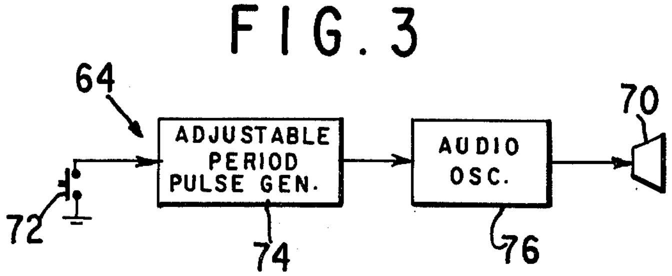
FIG. 3 is a block diagram of an encoder used with the communication system of FIGS. 1 and 2.
Figure 4:
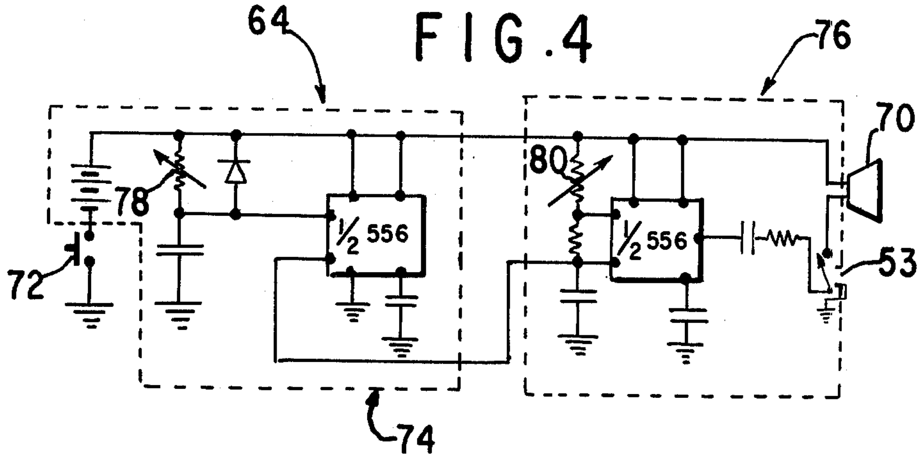
FIG. 4 is a schematic diagram of the encoder of FIG. 3.
Figure 7:
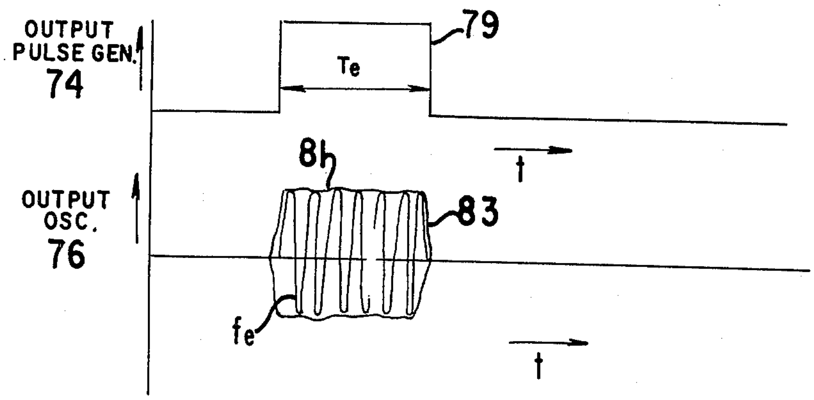
FIG. 7 is a diagram of signal waveforms occurring at various locations in the circuit arrangement of FIG. 4.

The encoding means 64 as illustrated in FIG. 3 is shown to comprise an adjustable period, one shot pulse generator 74 which is actuated by the push button switch 72 and which enables the operation of an adjustable frequency audio oscillator 76. The output of the oscillator is applied to the speaker 70. As illustrated in FIG. 4, the adjustable period pulse generator 74 comprises one-half of a 556 integrated circuit which is coupled as a one shot pulse generator having an adjustable period. A potentiometer 78 is provided for varying the period of an output pulse. The waveform 79 of the output pulse of generator 74 is illustrated in FIG. 7. Audio oscillator 76 comprises one-half of a 556 integrated circuit which is coupled as an audio oscillator. A potentiometer 80 is provided for varying the frequency of this oscillator over a band of frequencies $f_b$ which lie in the audio intelligence band. In a preferred arrangement, the output signal of the oscillator 76 has a relatively flat frequency response characteristic and is adjustable in frequency over the range of about 1 KHz to about 5 KHz. The pulse period is preferably adjustable over a range from about 1 second to about 4 seconds. Through the selective adjustment of both the output frequency $f_e$ of the oscillator 76 and the period or pulse interval $T_e$ of the envelope 81 of the output signal, a relatively large combination of oscillator frequencies $f_e$ and intervals $T_e$ can be selected. As many as 100 such combinations of $f_e$ and $T_e$ are believed to be practical. The user of the encoder therefore has the facility for selecting any one of a relatively large number of combinations of $f_e$ and $T_e$ thereby permitting selection of a control signal which differentiates from the remote control signals which may be utilized in the same or adjoining locations.

Figure 5:
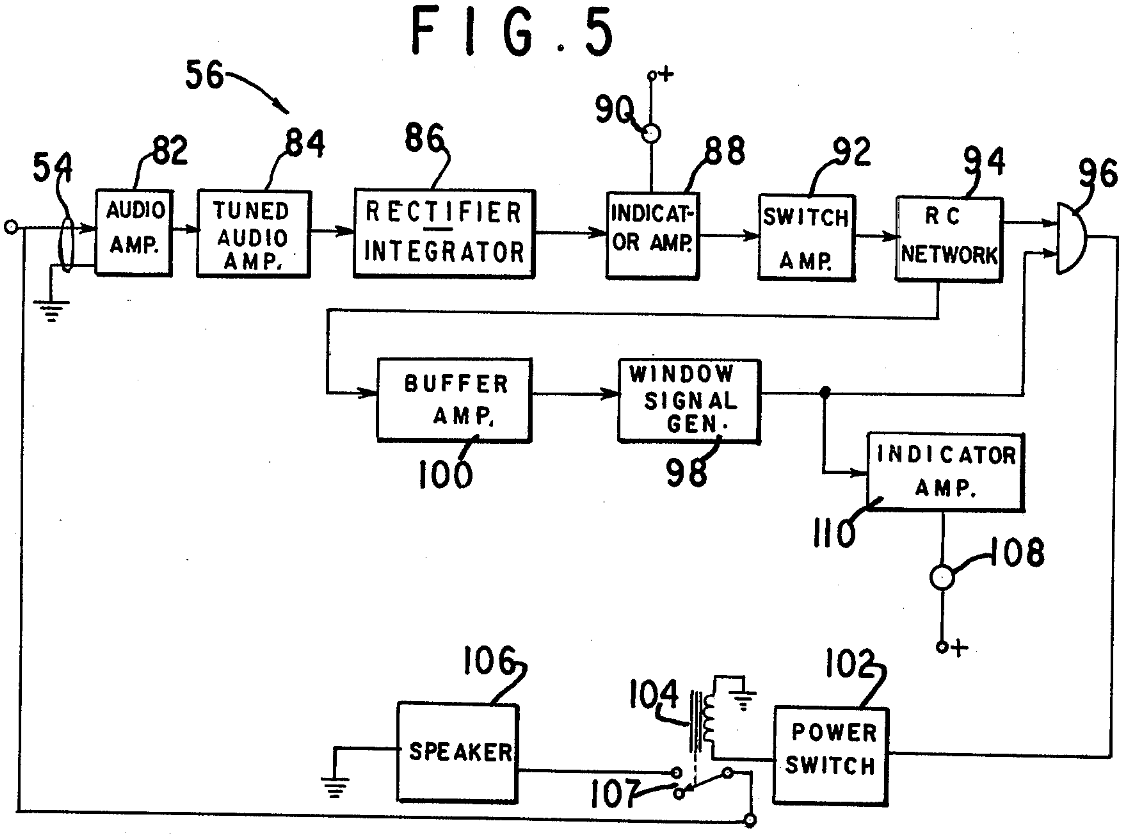
FIG. 5 is a block diagram of a decoder utilized with the communication systems of FIGS. 1 and 2.

The decoder 56 is adapted to respond to the encoded control signal generated by the encoder 64 and is shown in block form in FIG. 5. Voice modulating audio intelligence includes many frequency components which confuse and erroneously activate remote control decoding means which have previously been utilized with communication apparatus of the type described. Apparatus operating with the same control frequency can also falsely activate the decoder. Alternatively decoding means which have been sufficiently discriminatory and avoid this problem have been prohibitively expensive for use with relatively low cost communication apparatus. Three forms of discriminator decoder circuit means are provided with the decoder 56. A tuned circuit having a high Q selectively tunes the decoder to input signals of the preselected frequency. It has been found that voice modulation components in the frequency range of about 1 KHz to about 5 KHz exhibit gaps in signal continuity. The decoder 56 senses the presence of an erroneous voice modulation signal component occurring at a same preselected frequency $f_e$ as the remote control signal by sensing the occurrence of these gaps. The decoder 56 includes discriminating means for generating a window signal which is preselectively timed with respect to the interval $T_e$ of a received remote control signal. Means are provided for sensing the coincidence of a trailing edge segment 83 (FIG. 7) of the encoder signal waveform 81 and a window signal, thereby indicating receipt of an encoder signal and initiating activation of an element at the first station.

Referring now to FIG. 5, audio signals which have been detected by the transceiver 20 are applied via cable 54 to an audio amplifier 82. In addition to an encoded remote control signal which has been generated by the encoder 64 and received by the transceiver 20, there will also be applied to the audio amplifier 82 the intelligence signal received by transceiver 20, undesired electrical noise having a spectrum of frequency components in the audio band, undesired remote control signals from other unrelated apparatus and undesired audio intelligence resulting from other third party transmissions. The output signal of amplifier 82 is applied to a sharply tuned radio amplifier 84 which exhibits a relatively high Q and which discriminates against adjacent frequencies differing from the encoding frequency $f_e$. The reception of a control signal of frequency $f_e$ is detected by a rectifier and integrator means 86. The integrator is a relatively fast discharge integrating circuit arrangement which is also known as a "leaky" integrator. It operates to sense gaps in continuity of a received signal of frequency $f_e$ which have been passed by the tuned circuit 84 but which consist of undesired voice signal frequency components. This circuit disables response of the decoder to such signals. However, the reception of a control signal causes an output from the integrator substantially for the interval $T_e$ which is applied to an indicating amplifier 88. Reception of the encoding signal of frequency $f_e$ causes conduction of the amplifier 88 which energizes an indicating lamp 90. Thus, when an encoder control signal of frequency $f_e$ is being received, the lamp 90 will be continuously illuminated. During the receipt of audio modulation components and noise, the lamp 90 will flicker on and off as the leaky integrator repeatedly charges and discharges.

In addition to sensing for an encoder signal of the preselected frequency $f_e$, the decoder 56 also senses the period of duration of the encoding signal. As described hereinafter, the decoder 56 is tuned both to the encoding frequency $f_e$ and to the encoding period or interval $T_e$ of the encoding signal. The decoder then senses for signals of the proper frequency $f_e$ which occur for the preselected interval $T_e$. Sensing of the preselected interval $T_e$ is provided by circuit means including a switch amplifier 92 to which the output of the indicator amplifier 88 is coupled. Amplifier 92 disables or enables expotential charging of an RC network 94. An output of the RC network is applied to AND gate 96. A second input to the AND gate 96 is provided by a window signal generator 98. The window signal generator provides a sampling window having a width of about 0.1 × $T_e$ and which is timed to occur in time coincidence with the trailing edge 83 (FIG. 7) of the envelope waveform 81 of the control signal. Window signal generator 98 is enabled by the RC network 94 via a buffer amplifier 100. The AND gate 96 senses coincidence in time of the termination of the encoder signal and the window interval thereby indicating reception of a control signal having the preselected duration $T_e$.

An output of AND gate 96 is applied to and enables a power switch 102. The power switch energizes a coil of a relay 104 and causes activation of an element 106. The element 106 comprises, for example, a speaker to which signals on cable 54 are applied via switch contacts 107 of the relay 104. The speaker 106 is thus activated by the encoder signal from the second remotely located station and responds to audio intelligence being transmitted from the transceiver 22 to the transceiver 20. Speaker 106 then serves as the speaker for transceiver 20. Other elements such as horns, whistles, lights can be similarly activated.

The remote control arrangement provides the users with means for selecting a control signal frequency $f_e$ and duration $T_e$ from a plurality of combinations of $f_e$ and $T_e$. A means is therefore provided for tuning the decoder 56 to $f_e$ and $T_e$ which are selected at a remote second station. Reception at $f_e$ is indicated by continuous illumination of lamp 90 during tuning. Reception of a signal with a preselected interval $T_e$ is indicated by a lamp 108. An output signal from the window signal generator 98 is also applied to an indicator amplifier 110 having the indicating lamp 108 coupled in its load circuit. During the occurrence of the window interval, the amplifier 110 will be cut off and the lamp 108 will become deenergized. In tuning the decoder, proper tuning is indicated when the lamp 90 and the lamp 108 are simultaneously extinguished. The extinguishment of the lamp 90 indicates the termination of the envelope 81 of the encoding signal and the simultaneous extinguishment of the lamp 108 indicates that the trailing edge 83 (FIG. 7) of the envelope occurred during the window interval. Potentiometer control knob adjustments 112 and 114 (FIG. 1) are provided for permitting the user to effect this tuning to simultaneous extinguishment of the lamps. During tuning, the presence and absence of the control signal is indicated by flickering lamps 90 and 108. Although such on-off flickering will occur, the party tuning the decoder adjusts the knobs 112 and 114 to effect simultaneous extinguishment of the lights. During this tuning process, parties at the first and second remote stations communicate via the transceivers 20 and 22.

Figure 6:
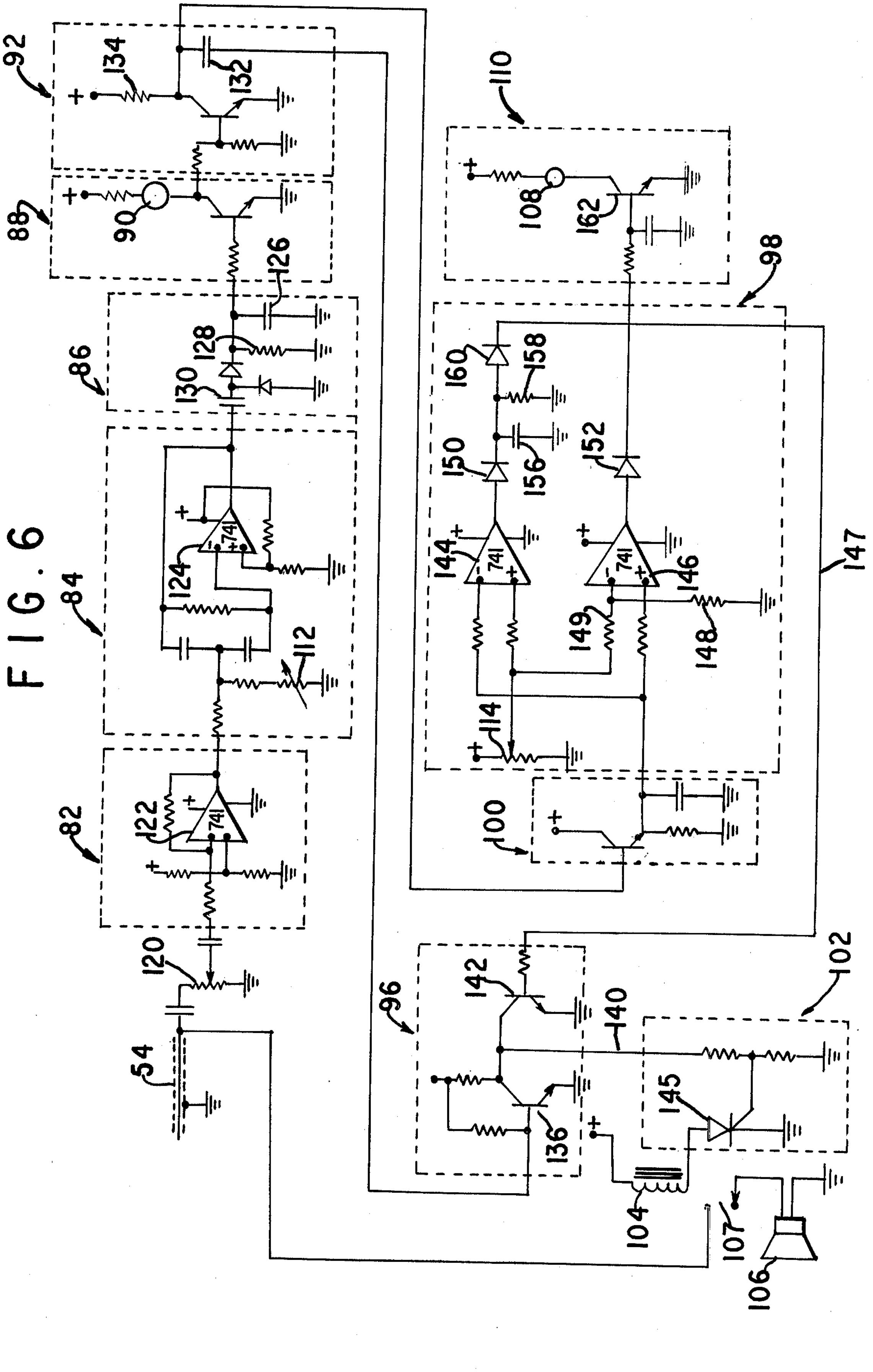
FIG. 6 is a schematic diagram of the decoder of FIG. 5.

A circuit arrangement of the decoder 56 is illustrated in FIG. 6. Those stages of FIG. 6 which have been discussed with respect to FIG. 5 are illustrated within dashed rectangles and bear the same reference numerals. The input signal to the decoder is applied via the cable 54 and is coupled to the audio amplifier 84 through a sensitivity level setting potentiometer 120. The potentiometer is adjusted to the point at which lamp 90 just becomes extinguished and then slightly adjusting the potentiometer until the lamp becomes illuminated. The audio amplifier 84 is provided by an operational amplifier 122 and its output is applied to a tuner audio amplifier 84. Tuned audio amplifier 84 is provided by an operational amplifier 124 which is coupled to be frequency selective and to have a relatively high Q. Tuning of the amplifier to a desired frequency $f_e$ is provided by the potentiometer 112. Signals which are passed via the tuned amplifier 84 are coupled to the rectifier-integrator circuit arrangement 86 which is shown to comprise a capacitive input, voltage doubling detector and a leaky integrator circuit arrangement provided by a capacitance 126, a resistive impedance 128 and the input capacitance 130. As indicated hereinbefore, this circuit operates to discriminate between received control signals at the frequency $f_e$ and audio voice modulation components also at the frequency $f_e$ which have been passed by the tuned amplifier 84. These components generally exhibit a lack of continuity for extended intervals; i.e., less than 1 second. A gap in continuity is sensed by the integrator circuit arrangement. By the relatively rapid discharge of the integrator to a lower voltage level during occurrence of a gap. An output of the detector-integrator 86 is applied to a base electrode of a transistorized indicator lamp amplifier 88. When the output of the detector integrator 86 is sufficiently positive the amplifier 88, which is normally cut off, is driven to conduction and the lamp 90 is illuminated. During receipt of a control signal, the lamp 90 will remain illuminated while in the absence of a control signal it may flicker on and off depending upon the extent of interfering signals at $f_e$ which are received. An output of the amplifier 88 is coupled to a base electrode of transistorized gate amplifier 92. Gate amplifier 92 is conductive in the absence of a control signal at frequency $f_e$. Upon reception of a control signal, an output from the amplifier 88 drives the transistorized amplifier 92 to cut off. An RC charging network which was referred to hereinbefore and referenced in FIG. 5 by numeral 94 comprises a capacitance 132, a collector load resistance 134 of the amplifier 92 and a base-emitter resistance of a transistorized amplifier 136 of AND gate 96. Upon cutoff of gate amplifier 92, the RC network charges. However, in the absence of a signal of frequency $f_e$, the indicator amplifier 88 causes the transistorized gated amplifier 92 to conduct and to discharge the capacitance 132. Thus, the charging of the capacitance 132 is dependent on the reception of a signal of frequency $f_e$. The discharge of the capacitance 132 causes the transistorized amplifier 136 to be driven to non-conduction by discharge depletion in the base-emitter circuit of the transistor 136. An output line 140 from the AND gate 96, however, will remain at a relatively low level until a transistor 142 of the AND gate is also driven to non-conduction. Transistor 142 is driven to non-conduction by the occurrence of a window signal which is applied to its base electrode from the window signal generator 98.

Figure 8A:
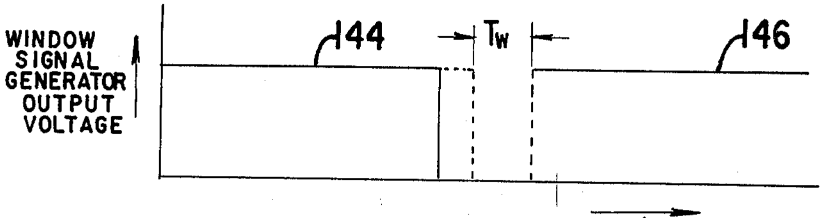
FIGS. 8A, 8B, 8C, 8D and 8E are diagrams of signal waveforms occurring at various locations in the circuit arrangement of FIG. 6.
Figure 8B:
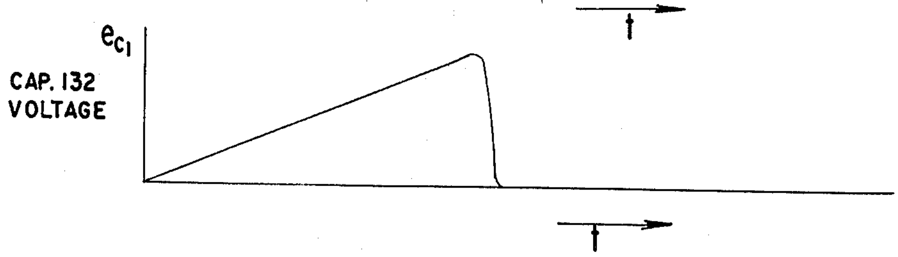

An output of the gate amplifier 92 is also applied to an input of the window generator 98 through the amplifier 100. The latter amplifier comprises a relatively high input impedance emitter follower amplifier which isolates the RC charging network from the window amplifier. The window generator comprises operational amplifiers 144 and 146 which are intercoupled in a level sensing switching arrangement and provide an output on line 147. These operational amplifiers comprise 741 units, for example. As illustrated in FIGS. 8A and 8B, the output from the amplifier 144 starts to switch when the input voltage from amplifier 100 attains a predetermined amplitude. The level at which the amplifier is switched and thus tuning of the decoder to the period $T_e$ is provided by adjustment of the potentiometer 114. This switching level is established to coincide with a predetermined charge voltage $e_{cl}$ on the capacitor 132 which is applied to the window generator 98 through the amplifier 100. Switching of the amplifier 146 is delayed by delay resistances 148 and 149. Resistances 148 and 149 are selected to provide an interval of delay time equal to about $0.1T_e$. A window $T_w$ (FIG. 8A) in the output level of the window generator 98 existing on an output line 147 is thereby established. Diodes 150 and 152 provide isolation between the amplifiers 144, 146 while a pulse stretching network including capacitance 156, a resistive impedance 158 and a diode 160 extend the time at which the window signal is applied to the gate 96. This effects relatively closer time coincidence between switching of the window generator with discharge of the RD network. The dashed line on the window signal generator output voltage in FIG. 8A indicates the actual window generated.

Figure 8C:
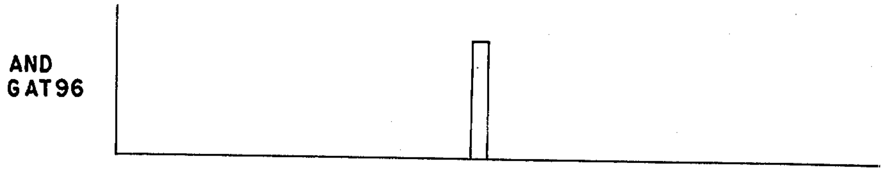
Figure 8D:
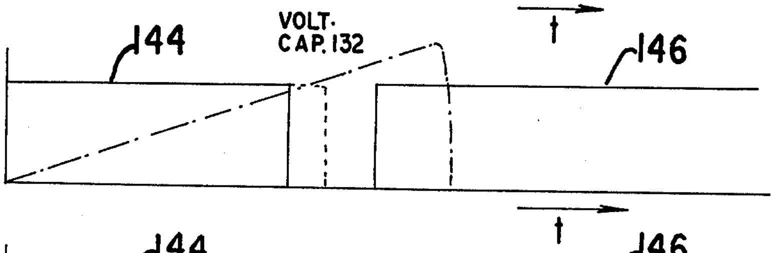
Figure 8E:
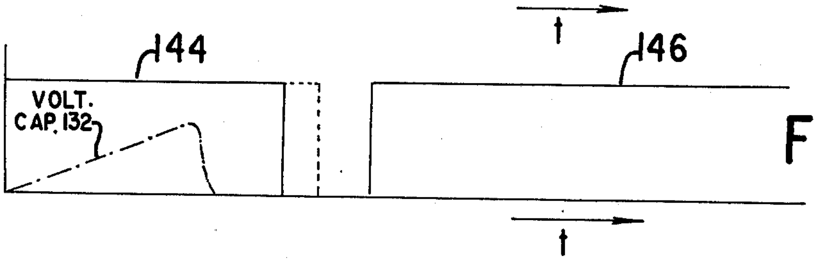

During the window interval $T_w$, the transistor 142 of AND gate 96 is driven to cutoff by discharge of capacitor 132 (FIG. 8B). Coincidence between the discharge and the window interval $T_w$ causes an output on the line 140 of AND gate (FIG. 8C). This output is applied to the power switch 102 comprising a silicon controlled rectifier 145 and causes conduction thereof and energization of a coil of the relay 104. Relay contacts 107 then switch and couple the speaker 106 to the cable 54 for activating the speaker 106. FIG. 8D illustrates the capacitor 132 charging to a voltage representative of a signal having a period in excess of $T_e$ and anticoincidence with the output on line 147. Similarly, FIG. 8E illustrates anticoincidence when the signal exists for an interval shorter then $T_e$.

An output of the window generator is also applied to the transistorized indicator amplifier 110 and during the window interval causes the cut off of the transistor 162 and extinguishment of the lamp 108. Tuning of the encoder to the frequency $f_e$ and period $T_e$ is accomplished by adjustment of the potentiometers 112 and 114 as indicated hereinbefore.

FIG. 2 illustrates a two-way remote control communication system between first and second remotely located station. In FIG. 2, an encoder 170 is provided for the transceiver 20 at the first station while a decoder 172 is provided for the transceiver 22 at the second station.

Tuning of the decoder 56 to the encoder signal is also conveniently accomplished at a same station by providing a jack 53 at the encoder as illustrated in FIG. 1 and FIG. 4 and coupling the jack 52 of the decoder to this jack.

While the remote control arrangement has been described for use with radio frequency transceivers, it may also be utilized with various other forms of communication systems including wire as well as wireless systems. Various alternative arrangements can also be provided. For example, the encoder control signal, while advantageously coupled acoustically to the transceiver 22 may also be coupled electrically via a cable to this transceiver. The decoder is advantageously utilized with present day communication apparatus by coupling the telephone jack 52 (FIG. 1) to external speaker jacks existing with such equipment. The use of acoustical encoder coupling and an external speaker jack with the decoder eliminates the need for an revison to existing communication equipment.

There has thus been described an improved remote control arrangement for use with a communication system wherein a control signal of frequency $f_e$ lies in an intelligence signal band $f_b$ of the communication system. The remote control is particularly advantageous in that it provides a relatively high degree of discrimination against interfering signal components while the apparatus is relatively simple and economical in construction.

While particularly embodiments of the invention have been described, it will be apparent to those skilled in the art that variations may be made thereto without departing from the spirit of the invention except as defined in the appended claims.

What is claimed is:

1. In a communication system for transmitting intelligence occurring within a band of frequencies $f_b$ between first and second remotely located stations, an improved remote control arrangement for controlling an element at the first station from the second station comprising:

A. a decoder located at the first station;

B. an encoder located at the second station;

C. said encoder having means for generating a control signal of preselected frquency $f_e$ which occurs for a preselected interval of time $T_e$ and for selectively varying the frequency $f_e$ over a range of frequencies lying in the band of frequencies $f_b$ and selectively varying the interval of time $T_e$;

D. said decoder including means for detecting the reception of a signal of preselected frequency $f_e$ and preselected interval $T_e$ and for discriminating against signals of other frequencies and intervals;

E. said arrangement including adjustable circuit means at said first station for tuning said decoder to be selectively responsive to a frequency $f_e$ and adjustable circuit means for tuning said decoder to be selectively responsive to the interval $T_e$;

F. said arrangement including a transceiver located at said first station and communication apparatus located at said second station for communicating between said first and second stations, said transceiver being adapted for providing a detected signal representative of received intelligence and said decoder including means for coupling the detected signal from said transceiver to said decoder; and G. said decoder including circuit means for generating a window signal which is timed with respect to the interval $T_e$, and means for sensing coincidence in time between the occurrence of the window signal and termination of the control signal interval $T_e$ for activating an element at said first station.

2. In a communication system, an improved remote control arrangement, as claimed in Claim 1, including circuit means for providing an indication of the occurrence of said window signal.

* * * * *